United States Patent [19]

Fraser

[11] 4,218,756
[45] Aug. 19, 1980

[54] CONTROL CIRCUIT FOR MODIFYING CONTENTS OF PACKET SWITCH RANDOM ACCESS MEMORY

[75] Inventor: Alexander G. Fraser, Bernardsville, N.J.

[73] Assignee: Bell Telephone Laboratories, Incorporated, Murray Hill, N.J.

[21] Appl. No.: 916,705

[22] Filed: Jun. 19, 1978

[51] Int. Cl.² .............................................. H04J 3/08
[52] U.S. Cl. ...................................... 364/900; 370/94
[58] Field of Search ................ 364/200 MS File, 200, 364/900

[56] References Cited

U.S. PATENT DOCUMENTS

| | | | |
|---|---|---|---|
| 3,657,705 | 4/1972 | Mekota, Jr. et al. ................ | 364/200 |
| 3,979,733 | 9/1976 | Fraser .................................. | 364/900 |
| 4,032,899 | 6/1977 | Jenny et al. ......................... | 364/200 |
| 4,055,851 | 10/1977 | Jenkins et al. ...................... | 364/200 |
| 4,130,885 | 12/1978 | Dennis ................................. | 364/900 |

Primary Examiner—Raulfe B. Zache
Attorney, Agent, or Firm—Roy C. Lipton

[57] ABSTRACT

The information in the header portion of a data packet, which header includes the old module and channel numbers, is used to access locations in a random access memory which contain new module and channel numbers or words that identify the packet routing. To convert the "virtual" address defined by the old module and channel numbers to a physical address, the module number accesses a memory word which is combined with the channel number to produce a single physical address number. When the information stored in the memory is to be changed, the header has special module and channel numbers and the following data includes a "write" command word, address data and information data. The special header words access a memory word which enables the writing of the information data into memory locations selected by the address data. A "read" command word in the packet inserts the word accessed by the address data into the packet.

6 Claims, 2 Drawing Figures

CONTROL CIRCUIT FOR MODIFYING CONTENTS OF PACKET SWITCH RANDOM ACCESS MEMORY

TECHNICAL FIELD

This invention relates to digital data switching systems and, more particularly, to the processing of data packets as they are routed through the interconnected switching nodes of the system.

BACKGROUND OF THE INVENTION

In one class of packet switching systems, as each digital data message enters the system, a route through the system to the message destination is determined and a virtual connection is set up by storing at each switching node in the route the information defining the path that the message takes through the node. The entering message is assembled into fixed length packets and each packet is formatted into a header portion and a data portion. The header portion contains information that is unique to the virtual channel, which header information is used by each node to direct the packet therethrough to the next node or to the destination line or channel.

To provide for growth, it is advantageous to arrange packet nodes or switches in modular form. A general modular form is shown in U.S. Pat. No. 4,032,899 issued to C. J. Jenny and K. A. Kuemmerle on June 28, 1977. The Jenny et al arrangement provides a common data bus which interconnects at least one control circuit with a plurality of input/output modules. Each module accommodates a plurality of lines or channels, each channel being reserved by an incoming or outgoing message. Accordingly, each incoming packet on a particular one of the incoming lines of a particular one of an input/output module is passed by the module via the data bus to the control circuit which directs the packet via the bus to an outgoing line of a module. Both the output module and the outgoing line are identified by information stored in the control circuit to define the path to be taken by the packets from that particular incoming line.

A specific control circuit for processing packets through a node is disclosed in U.S. Pat. No. 3,979,733 which issued to me on Sept. 7, 1976. The control circuit in my patent functions to move the data packet from incoming channel to outgoing channel and to change or modify the header information to designate the new channel that the packet takes on its journey through the system. In accordance therewith, storage locations of a random access memory are accessed by the packet header which identifies the old (or incoming) channel number, which storage locations contain the new (or outgoing) channel number. The control circuit substitutes the old channel number in the header with the new number accessed from the memory, which new number will be used to direct the packet to the correspondingly numbered outgoing channel.

New information is written by the node processor in the random access memory each time a virtual connection is set up and taken down. Information may be read out of the memory by processors monitoring the system operation or providing housekeeping functions such as reconfiguration of the network. The memory may be advantageously accessed by special or predetermined numbers or words in the packet header followed by control data containing a "read" or "write" command word, an address word identifying the memory storage locations of the information to be accessed and finally data words to be written into the memory if a write operation is desired. Conventionally, decoding circuits recognize the special header words and enable the address words to then access the memory. In a modular system, however, where system growth has to be accommodated, these special words must be periodically changed, requiring changes in the decoding circuits.

It is an object of this invention to write information into a control memory of a packet switch. It is a companion object of this invention to read information out of the memory.

It is another object of this invention to recognize packet headers received from processors.

As noted above, in a modular system, the incoming packet is received from a particular incoming channel in a particular module and is directed to an outgoing channel of an output module. The header of the packet therefore contains the old (or incoming) module number and the old channel number and these numbers are used to access new module and channel numbers. Thus, the old header numbers define a "virtual" address in the memory which has to be converted to the corresponding actual or physical address.

It is therefore a further object to convert a two-number virtual address to a physical address.

SUMMARY OF THE INVENTION

In accordance with objects of this invention, certain words in the memory are accessed by the special words in the header of packets originating from processing units and the read out of these certain words enables the writing of data from the control data portion of the packet into other specific locations of the memory. Accordingly, if the special header words are changed to accommodate system growth or reconfiguration of the network, the certain words in the memory can be accessed by these new header words by modifying the information in the memory; thus no change in circuitry is required.

In accordance with a feature of this invention, the control data words in the packet are written into memory locations selected (or accessed) by the address words in the packet.

In accordance with a further feature of this invention, the words accessed by the address words are registered when the control data includes a "read" command. The registered words are then inserted into the data packet.

In accordance with another object of this invention, a two-number address in the packet is converted to a single number physical address by utilizing a first one of the address numbers to access a data word in the memory, modifying the subsequent address number with the read out data and utilizing the modified number as the physical address of the word which will constitute the new module and channel numbers.

The foregoing and other objects and features of this invention will be more fully understood from the following description of an illustrative embodiment taken in conjunction with the accompanying drawings.

DETAILED DESCRIPTION

Figure 1:
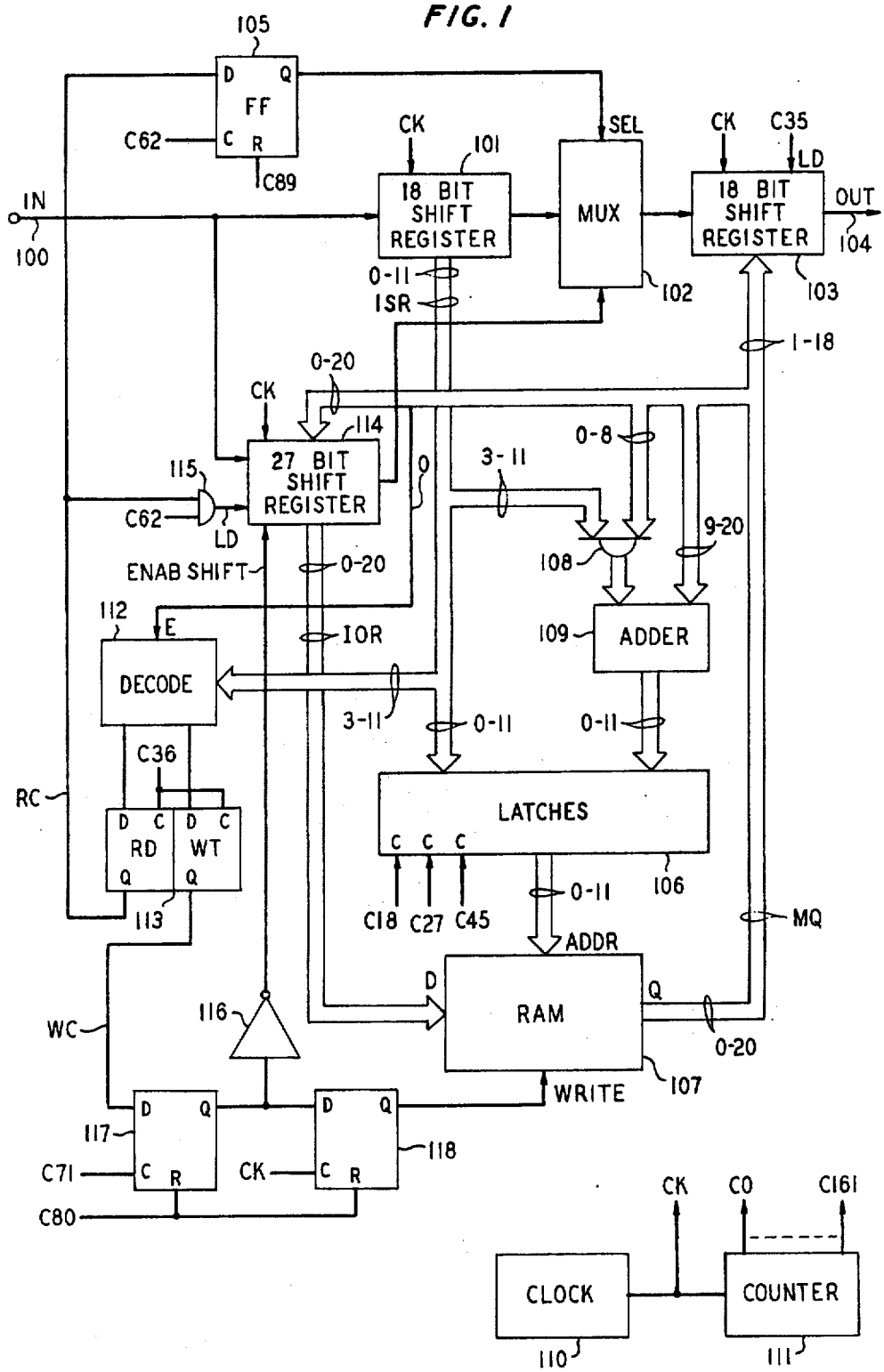
FIG. 1 discloses, in block and schematic form, the various circuits which form a control circuit in accordance with this invention.

The control circuit of FIG. 1 accepts data bursts or packets on input terminal 100 from incoming channels by way of an incoming data bus (not shown), processes the packets in the manner described hereinafter and applies the packets to output terminal 104 to be forwarded to outgoing channels via an outgoing data bus (not shown).

Each data packet includes header and data information, the header information designating the route or path that the packet is following. The packet processing normally consists of modifying the header information with data obtained from the control circuit random access memory 107 to designate the route the packet will take through the switch. In the event that the data packet is received from a packet switch processor with instructions to either read out or to modify the information in random access memory 107, data information (subsequent to the header information) in the data packet is utilized to read out information from random access memory 107 for insertion into the data packet or, alternatively, is utilized to provide information which is to be written into memory 107.

Each data packet has 162 bits of data which are divided into 18 envelopes of nine data bits each. A typical format of a packet is shown as packet 200 in FIG. 2.

The first envelope of the packet, illustratively shown as envelope 201, is a 9-bit module number which might identify the input module which accommodates the incoming channel which received the data packet. The module number envelope is followed by envelope 202 which comprises the 9-bit incoming channel number. Module number envelope 201 and channel number envelope 202 make up the data packet header which will be modified by the control circuit to identify the desired output module and outgoing channel numbers.

Conventionally, the following 16 envelopes of data bits, which constitutes the data portion of the packet, will pass unmodified through the control circuit of FIG. 1 to output terminal 104 with the exception of situations where the packet has been originated by the switch processor, as noted above. In this latter event, the third envelope 203 contains a command word to instruct the control circuit to either write new information into subsequently identified storage locations in memory 107 or to read out information from subsequently identified storage locations in the memory. This subsequently identified storage location information is contained in address envelopes 204 and 205 and the new information to be written into the memory, if a writing is desired, is contained in data envelopes 206, 207 and 208.

When the initial portion of the data packet arrives at terminal 100, the bits of the module address envelope are clocked into 18-bit shift register 101. When the bits of the module address are shifted to the forward stages of shift register 101, they are latched into latches 106 which, in turn, applies the 9-bit module number to the "address" input of RAM 107. This 9-bit number is used to access the lower 512 words in 4096 word memory 107.

Figure 2:
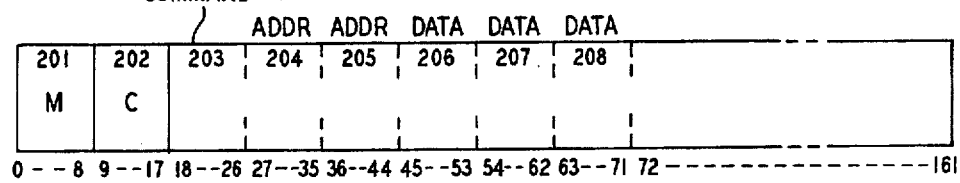
FIG. 2 discloses the formats of a data packet and certain words useful in operating this invention.
Figure 2:
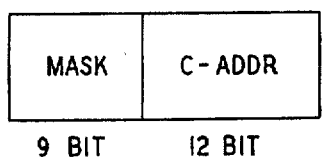
Figure 2:
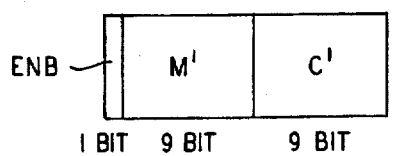

Each of the lower 512 words of memory 107 contains 21 bits and has the organization illustratively shown as M-Table 210 in FIG. 2. More specifically, the M-Table word consists of a 9-bit mask and a 12-bit address number designation. Subsequently, when the channel number envelope is shifted into the forward stages of shift register 101, this channel number is combined with the M-Table word by logic circuitry consisting of AND gates 108 and adder 109. The value number thereby obtained is latched into latches 106 and is thereupon used to access the upper part of RAM 107. The stored word thus accessed is the C-Table word illustratively shown as C-Table 220 in FIG. 2.

As seen in FIG. 2, the C-Table word consists of a 1-bit flag or enabling (ENB) bit, a 9-bit "new module" number M' and a 9-bit "new channel" number C'. Meanwhile, the input module number and the incoming channel number in shift register 101 are shifted therethrough and then through multiplexer 102 to 18-bit shift register 103.

When the shifting is complete and the input module and incoming channel numbers of the packet header are fully shifted into shift register 103, they are overwritten by the new module and channel numbers provided by random access memory 107. These new numbers advantageously designate the numbers of the output module and the outgoing channel. The new numbers are then shifted through register 103 to the data bus connected to output terminal 104. The output module, thereby designated, selects the designated outgoing channel using, for example, standard space switching techniques.

The remainder of the packet, which passes through multiplexer 102 and then follows the new packet header through shift register 103 to the output data bus, are then passed to the designated outgoing channel in the designated output module. This process is then repeated upon the arrival of the next packet on terminal 100.

A data packet from the switch processor may contain, in the data, a command to read data from, or write data into, the memory. In either case, the packet header accesses a C-Table word where the ENB or flag bit is a "1" bit which enables decoder 112. The header is modified by the new module and channel numbers being overwritten into shift register 103 in the same manner as priorly described. The next data envelope 203, however, constitutes a command word which is examined by decoder 112 to enable one of a pair of flip-flops 113 to designate whether the command word is a read command or a write command. In either case, the following two envelopes in the data packet includes the memory address of the storage locations in RAM 107 to be accessed for the read or write operation and this address is now latched by latches 106. If the command word is a read command, the word stored in the memory locations designated by the address envelopes is written into 27-bit shift register 114. Thereafter, multiplexer 102 is switched from the output of shift register 101 to the output of shift register 114 to insert the word thus read out into the data packet and behind the data address envelopes, passing the packet thus modified through shift register 103 to output terminal 104. In the event that the data packet contains a write command, the data in envelopes following address envelopes 204 and 205, such as data envelopes 206, 207 and 208, are written into RAM 107 at memory locations designated by address envelopes 204 and 205.

Timing for the control circuit of FIG. 1 is provided by clock 110 whose output clock pulses, passed to lead CK, have a pulse rate which defines the signaling or bit rate of the data bits of the packets. These clock pulses, in addition to being utilized by the control circuit, are also passed to counter 111. Counter 111 is a recycling counter which recycles after 162 counts, the recycling timer therefore defining the interval of a data packet. At each of the count intervals, a clock pulse appears at one of 162 counter outputs, the clock pulse appearing at the first count interval being applied to lead C0 and the clock pulse appearing in the last interval being applied to lead C161. The clock is synchronized with the appearance of the data packet on input terminal 100 by conventional methods whereby the first bit of the data packet appears on terminal 100 concurrently in time with the appearance of clock pulse C0, each succeeding bit of the packet appearing concurrently in time with correspondingly identified outputs of counter 111 and the last bit of the packet appearing concurrently in time with the clock pulse C161. Clock pulse CK appears coincident in time with the appearance of every bit of the data packet on terminal 100.

The data packet is clocked into shift register 101 by the clock pulse CK, the leading edge of the clock pulse shifting each of the bits successively into the shift register. In the 18$^{th}$ clock pulse period (clock pulse C17), the module number envelope 201 has been shifted to the front end of shift register 101. The outputs of the last 12 stages of shift register 101 are read, in parallel, onto bus ISR which contains 12 leads designated leads 0-11. The 9-bit module number is therefore applied to leads 3-11 of bus ISR. The leading edge of the C18 clock pulse selects leads 3-11 and clocks this 9-bit number on leads 3-11 of bus ISR into nine of the 12 latches in latches 106. The information in the other three latches of latches 106 contain "garbage" or "I don't care information" which, in this embodiment, comprises "0" bits. Latches 106, in turn, applies the 9-bit number to the address inputs of RAM 107. This, as previously described, accesses a particular one of the lower 512 words in RAM 107.

The output of random access memory 107 is passed to bus MQ which contains 21 parallel leads, namely leads 0-20. The M-Table word, read out in response to the application of the module number envelope to the address input of RAM 107, is applied to the 21 leads of bus MQ. More specifically, the 9-bit mask of the M-Table word is passed to leads 0-8 of bus MQ, which leads extend to inputs of AND gate 108. At the same time, the 12-bit C-address number is applied by RAM 107 to leads 9-20 of bus MQ and passed on to adder 109.

After 27 clock pulses, the channel number envelope is shifted to the output of shift register 101. This number is also applied to leads 3-11 of bus ISR. The word is thus combined by AND gates 108 with the 9-bit mask in the M-Table word. The result thus obtained at the output of AND gates 108 is added by adder 109 to the 12-bit C-address number in the M-Table word to produce a 12-bit word which is passed to latches 106. The C27 clock pulse applied to latches 106 selects the 12 lead output of adder 109 and stores the output of adder 109 into latches 106. This 12-bit word is passed by latches 106 to the address input of RAM 107 to thereby access the C-Table word. RAM 107 applies the C-Table word, thus accessed, to bus MQ. More specifically, the flag or ENB bit is applied to lead 0, the new 9-bit module number M' is applied to leads 1-9 and the new 9-bit channel number C' is applied to leads 10-18 of bus MQ. Leads 1-18 extend to the parallel data input of shift register 103 and lead 0 is connected to the enabling input of decoder 112.

During the 19$^{th}$-27$^{th}$ clock pulse intervals (clock pulses C18-C26), the module number envelope is shifted from the front end of shift register 101 into shift register 103 by way of multiplexer 102. Multiplexer 102 normally connects the output of shift register 101 to the first stage of shift register 103, which normal condition is indicated by flip-flop 105 in the normal reset condition. During the 28$^{th}$-36$^{th}$ clock pulse intervals (clock pulses C27-C35), the channel number envelope is shifted from shift register 101 through multiplexer 102 into shift register 103. Thus, at the start of the 36$^{th}$ clock pulse interval, shift register 103, which is an 18-bit register, stores the module number envelope in its front end stages and the channel number envelope in its back end stages.

During the 36$^{th}$ clock pulse interval, clock pulse C35 is applied to the load input of shift register 103. This overwrites the new module number and the new channel number on bus MQ into the 18 stages of shift register 103. The next clock pulse CK and the subsequent clock pulses now shift this new header information to output terminal 104 and shift the subsequent data information in the packet through shift register 101, multiplexer 102 and shift register 103 to output terminal 104 following the header information.

If the received packet is from the processor, the module number and the channel number in the header information, when processed by RAM 107 and AND gates 108 and adder 109, may develope an address word for RAM 107 which accesses a C-Table word from RAM 107 having a "1" bit in the "ENB" or flag bit position. The new module number and channel number in the C-Table word is overwritten into shift register 103, as previously described. At the same time the "1" bit in the ENB bit position is applied to lead 0 in bus MQ and thus passed to the enabling input of decoder 112. This enables decoder 112 to determine whether the command word 203 in the data packet is a "write" command or a "read" command.

The command word reaches the front end of shift register 101 in the 36$^{th}$ clock interval (clock pulse C35). The command word is thus passed to output loads 3-11 of bus ISR in the 36$^{th}$ interval. Leads 3-11 are applied to decoder 112 which, being enabled by the C-Table word ENB bit, passes a write or read command signal to flip-flops 113. Flip-flops 113 are clocked by the C36 clock pulse. If the command is a read command, the RD flip-flop "D" input is energized and the flip-flop is set by the clock pulse to provide an enabling potential to lead RC. Alternatively, if the command word is a write command, the WT flip-flop is set by the C36 clock pulse to provide an enabling potential to lead WC.

Assume that the command word is a read command and lead RC is thereby enabled. The enabling of lead RC enables gate 115 and applies an enabling potential to the "D" input of flip-flop 105. The control circuit now continues to accept the data packet, shifting in the data envelopes 204 and 205 containing the address words.

The first address word envelope 204 is shifted in by clock pulses C27 to C35 and the second address word envelope 205 is shifted in by clock pulses C36 to C44. Accordingly, in the 45$^{th}$ clock interval, the two address word envelopes are stored in shift register 101.

The 12 bits which make up the address word to be applied to RAM 107 comprise the nine bits of data envelope 204 and the first three bits of data envelope 205. These 12 bits are, during the 45$^{th}$ clock interval, applied to leads 0-11 of bus ISR. The application of clock pulse C45 to latches 106 selects the 12 leads of bus ISR and clocks the bits into the 12 latches of latches 106 and this 12-bit number is applied to the address input of RAM 107. The word in the storage location in RAM 107 thereby designated by the address word is passed to bus MQ.

The last bit of address envelope 205 is shifted by clock pulse C62 to the first stage of shift register 103. The C62 clock pulse is also passed through enabled gate 115 to the load input of shift register 114. The word accessed from RAM 107 and applied to bus MQ is thereupon loaded into shift register 114. Clock pulse C62 also clocks flip-flop 105 to the set condition due to the enabling potential applied to the D input of the flip-flop. Flip-flop 105 is thereupon set and its high Q output, passed to multiplexer 102, transfers the input of shift register 103 from the output of shift register 101 to the output of shift register 114.

The next CK clock pulse, and the clock pulses thereafter, shift the M-Table or C-Table word in shift register 114 through multiplexer 102 to shift register 103 to substitute the data in the packet with the word read out of RAM 107. Thereafter, in response to clock pulse C89, flip-flop 105 is reset, multiplexer 102 is restored to its initial condition wherein the output of shift register 101 is again connected to the input of shift register 103 and the remainder of the data packet is passed through shift registers 101 and 103 in the conventional manner. As a result, a read command has been provided in the data packet together with an address word defining the storage location of an M-Table or C-Table word in RAM 107. This word has been accessed and read out of RAM 107 and this read out word has been inserted in the data packet.

Assume now that the command word contains a "write" command. When the command word is decoded by decoder 112, the decoder energizes the "D" input of the WT flip-flop of flip-flops 113. Clock pulse C36 now sets the WT flip-flop to apply an enabling potential to lead WC. This enabling potential is passed to the "D" input of flip-flop 117.

During succeeding clock intervals the address envelopes of the data packet are shifted into shift register 101 and the address word therein is clocked into latches 106 by clock pulse C45, in the same manner as previously described, to thereby select and access the desired M-Table or C-Table word in RAM 107. The control circuit, however, does not otherwise use the accessed word when applied to lead MQ.

The $46^{th}$–$72^{nd}$ clock pulses shift data envelopes, namely envelopes 206, 207 and 208, into shift register 114 simultaneously with the shifting of the envelopes into shift register 101. The last bit of envelope 208 is shifted into register 114 by clock pulse C71 and this clock pulse also clocks flip-flop 117 to the set condition since an enabling potential is applied to its "D" input. An enabling potential is thereby applied to the output Q terminal of flip-flop 117. The enabling potential inverted by inverter 116 is passed to the enabling shift input of shift register 114. This removes the enabling potential normally applied to the enabling shift input of shift register 114 to prevent subsequent shifting. The three data envelopes 206–208 are thereby maintained in the 27 stages of shift register 114. In addition, the enabling potential from the "Q" output of flip-flop 117 is applied to the "D" input of flip-flop 118.

The next clock pulse CK, when applied to the clock input of flip-flop 118, drives the flip-flop to the set condition. The Q output of flip-flop 118 in the set condition applies an enabling potential to the WRITE input of RAM 107. At the same time, the conditions of the 21 forward stages of shift register 114 are passed to bus IOR, which bus extends to the data storing input "D" of RAM 107. Consequently, the data word derived from envelopes 206–208 of the data packet is written into RAM 107 at the storage locations designated by the address word derived from the address envelopes 204 and 205 of the data packet priorly passed to latches 106 and applied to the address input of RAM 107. A new M-Table or C-Table word is thereby written into the memory.

When clock pulse C80 is generated, flip-flops 117 and 118 are reset. The enabling potential to the WRITE input of RAM 107 is removed, the enabling potential normally applied to the enabling shift input of register 114 is again applied and the clocking information through shift register 114 is again enabled. It is noted that the set one of flip-flops 113 will be reset by the next C36 clock pulse, assuming that the next data packet does not contain a command word.

Although a specific embodiment of this invention has been shown and described, it will be understood that various modifications may be made without departing from the spirit of this invention.

I claim:

1. In a control system for bursts of data, each data burst including a header portion and a subsequent data portion, a random access memory system (107) having means for reading out data from addressed ones of storage locations in the memory and means (101, 103, 106, 108, 109) responsive to data information in the header portion for addressing the storage locations and for modifying the header portion with the data thereby read out of the addressed storage locations, characterized by
    means (106, 112, 113WT, 114, 116, 117, 118) responsive to certain of the data read out of the addressed storage locations for writing data from the data portion of the data burst into memory storage locations addressed by an address part of the data portion, the writing means being enabled by predetermined command data in the data portion.

2. In a control system, in accordance with claim 1, and further including means (112, 113RD, 114, 115) responsive to other predetermined command data in the data portion for disabling the writing means and for registering data read out of the storage locations address by the address part.

3. In a control system, in accordance with claim 2, and further including means (102, 105) for inserting the registered data into the data portion part of the data burst.

4. In a control system for packets of data, each data packet having a plurality of address envelopes and a plurality of data envelopes, a random access memory (107) having an address input for selecting storage locations in the memory and a data output for reading out the data stored in the selected storage locations, and means (101, 106) for applying an initial one of the address envelopes to the address input, Characterized by
    means (106, 108, 109) for modifying an address envelope subsequent to the initial one with the data read out in response to the application of the initial envelope and for applying the modified envelope to the address input, and
    means (106, 112, 113WT, 114, 116, 117, 118) responsive to data read out in response to the application of the modified envelope for writing a portion of the data in the subsequent data envelopes into selected storage locations of the memory.

5. In a control system, in accordance with claim 4, wherein the writing means includes means (106) for concurrently applying another portion of the data in the data envelopes to the address input to define the selected storage locations written into.

6. In a control system for packets of data, each data packet having a plurality of address envelopes and a plurality of data envelopes, a random access memory (107) having an address input for selecting storage locations in the memory and a data output for reading out the data stored in the selected storage locations, and means (101, 106) for applying an initial one of the address envelopes to the address input, Characterized by means (106, 108, 109) for modifying an address envelope subsequent to the initial one with the data read out in response to the application of the initial envelope and for applying the modified envelope to the address input and means (106) for applying a portion of the data in the subsequent data envelopes to the address input, and means (112, 113R, 114, 115) responsive to the data read out in response to the application of the modified envelope for registering the data read out in response to the application of the data portion.

* * * * *